United States Patent
Delisle-Simard et al.

(10) Patent No.: US 12,461,421 B2
(45) Date of Patent: Nov. 4, 2025

(54) RF CROSSING IN AN OPTICAL MODULATOR FOR EQUALIZATION

(71) Applicant: Ciena Corporation, Hanover, MD (US)

(72) Inventors: Alexandre Delisle-Simard, Québec (CA); Gregory Brookes, Québec (CA); Michael Vitic, Chelsea (CA)

(73) Assignee: Ciena Corporation, Hanover, MD (US)

( * ) Notice: Subject to any disclaimer, the term of this patent is extended or adjusted under 35 U.S.C. 154(b) by 429 days.

(21) Appl. No.: 18/120,894

(22) Filed: Mar. 13, 2023

(65) Prior Publication Data
US 2024/0310688 A1    Sep. 19, 2024

(51) Int. Cl.
*G02F 1/225* (2006.01)
*G02F 1/025* (2006.01)
*G02F 1/035* (2006.01)

(52) U.S. Cl.
CPC ............ *G02F 1/2255* (2013.01); *G02F 1/025* (2013.01); *G02F 1/2257* (2013.01); *G02F 1/0356* (2013.01); *G02F 2201/127* (2013.01)

(58) Field of Classification Search
CPC ...... G02F 1/2255; G02F 1/025; G02F 1/2257; G02F 1/0356; G02F 2201/127
USPC .......................................................... 385/1–3
See application file for complete search history.

(56) References Cited

U.S. PATENT DOCUMENTS

| | | | | |
|---|---|---|---|---|
| 4,797,641 A * | 1/1989 | Djupsjobacka | ....... | G02F 1/2255 385/2 |
| 4,843,350 A * | 6/1989 | Nazarathy | ............. | G02F 1/2255 385/3 |
| 6,580,840 B1 * | 6/2003 | McBrien | ............... | G02F 1/2255 385/2 |
| 7,088,874 B2 * | 8/2006 | Pruneri | ................. | G02F 1/2255 385/40 |
| 9,841,618 B1 | 12/2017 | Poulin et al. | | |
| 2013/0343693 A1 | 12/2013 | Doerr | | |
| 2014/0112611 A1 | 4/2014 | Vermeulen et al. | | |
| 2014/0341499 A1 | 11/2014 | Manouvrier | | |

(Continued)

FOREIGN PATENT DOCUMENTS

| | | |
|---|---|---|
| GB | 2348293 A | 9/2000 |
| JP | 201721607 A | 11/2017 |

OTHER PUBLICATIONS

Ning-Ning Feng et al., High speed carrier-depletion modulators with 1.4V-cm VπL integrated on 0.25 μm silicon-on-insulator waveguides, 2010 Optical Society of America, Apr. 12, 2010/Vo. 18, No. 8/Optics Express 7994, pp. 1-6.

(Continued)

*Primary Examiner* — Robert Tavlykaev
(74) *Attorney, Agent, or Firm* — Baratta Law PLLC; Lawrence A. Baratta, Jr.

(57) ABSTRACT

An optical modulator includes an optical waveguide extending a length; and a plurality of Radio Frequency (RF) electrodes configured to modulate an optical signal in the optical waveguide, wherein the RF electrodes include an RF crossing located an end of the length and that is configured to equalize the optical signal. The optical signal is equalized via destructive interference after the RF crossing for attenuating modulation amplitude. At or near the end of the length, high frequencies of the optical signal are already strongly attenuated whereas low frequencies of the optical signal are not such that the low frequencies are equalized after the RF crossing.

17 Claims, 17 Drawing Sheets

(56) References Cited

U.S. PATENT DOCUMENTS

| | | |
|---|---|---|
| 2014/0355925 A1 | 12/2014 | Manouvrier |
| 2014/0376852 A1 | 12/2014 | Manouvrier |
| 2018/0239176 A1 | 8/2018 | Tsuzuki et al. |
| 2019/0324345 A1 | 10/2019 | Vera Villarroel et al. |
| 2021/0080797 A1* | 3/2021 | Kissa ................. G02F 1/011 |
| 2021/0373364 A1* | 12/2021 | Zhang ................ G02F 1/2257 |

OTHER PUBLICATIONS

Vermeulen et al., Demonstration of Silicon Photonics Push-Pull Modulators Designed for Manufacturability, IEEE Photonics Technology Letters, vol. 28, No. 10, May 15, 2016, pp. 1127-1129.
Aug. 3, 2018, International Search Report and Written Opinion for International Application No. PCT/US2018/027239.
Nov. 29, 2021, International Search Report and Written Opinion for International Patent Application No. PCT/US2021/043497.
Yamaguchi et al., "Low-Loss Ti-diffused LiNbO3 Modular Integrated with Electro-Optic Frequency-Domain Equalizer for High Bandwidth Exceeding 110GHz," Tu4E.2, European Conference on Optical Communication (ECOC), Optica Publishing Group 2022, 4 pages.
Y. Yamaguchi et al., "Low-Loss Ti-diffused $LiNbO_3$ Modulator Integrated with Electro-Optice Frequency-Domain Equalizer for High Bandwidth Exceeding 110GHZ," European Conference on Optical Communication © Optical Publishing Group, Sep. 18, 2022, 4 Pages.
May 14, 2024, International Search Report and Written Opinion for International Patent Application No. PCT/US2024/019464.

* cited by examiner

Symmetrical
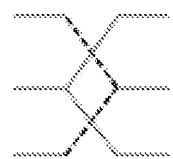
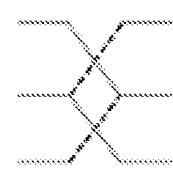
FIG. 22
Asymmetrical
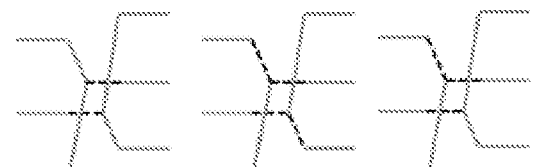
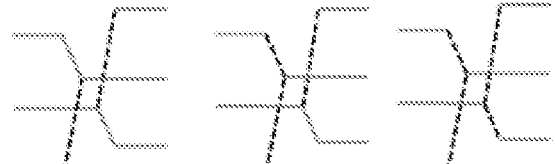
FIG. 23
Two Layers
| U | Braids | Long X |
  
Three Layers
FIG. 24
FIG. 25

RF CROSSING IN AN OPTICAL MODULATOR FOR EQUALIZATION

FIELD OF THE DISCLOSURE

The present disclosure relates generally to optical modulators. More particularly, the present disclosure relates to a Radio Frequency (RF) in an optical modulator for equalization.

BACKGROUND OF THE DISCLOSURE

In telecommunication application, information sent over a fiber link is distributed over a relatively broad frequency range (in the electrical domain) and the signal amplitude must be distributed evenly over this band. However, since optical modulators are more efficient at low frequencies, other elements in the chain must correct for these RF losses and equalize the signal. This equalization operation is usually done with the driver at the expense of more power and/or distortion. The driver is adjusted to add some peaking at high frequencies. As a result, the gain at low frequency is lower compared to the gain at high frequency which flattens the RF response of the concatenation. In Yamaguchi, Yuya, et al. "Low-Loss Ti-diffused LiNbO 3 Modulator Integrated with Electro-Optic Frequency-Domain Equalizer for High Bandwidth Exceeding 110 GHz." 2022 European Conference on Optical Communication (ECOC). IEEE, 2022, the contents of which are incorporated by reference, there are some equalizer schemes proposed to attenuate the low frequencies and thus reducing the Electro-Optical (EO) degradation between low frequency and high frequency.

BRIEF SUMMARY OF THE DISCLOSURE

The present disclosure relates to a Radio Frequency (RF) in an optical modulator for equalization. The present disclosure includes an increase of the bandwidth (BW) of Travelling-Wave (TW) modulators, without increasing the modulator $V_{pi}$, or any significant optical loss, via a passive optical equalizer in the modulator design that includes an electrical crossing. As a result, the section after the crossing will add up to the optical wave via destructive interference thereby attenuating the modulation amplitude. This approach maximizes the modulation amplitude at a given frequency without creating a large EO response drop. In an embodiment, this approach is suited for low optical loss modulators (such as Thin-Films Lithium Niobate (TFLN), Barium titanate (BTO), Quantum-Confined Stark Effect (QCSE, Ge/SiGe Multiple Quantum Well (MQW) phase shifters, ferro electric-based, pockel based Mach-Zehnder Modulator (MZM), and the like) since the trade-off for the bandwidth is obtained by increasing the modulator length which increases the propagation losses; however, the approach described herein can also be applied to other type of TW modulators in other platforms.

In an embodiment, an optical modulator includes an optical waveguide extending a length; and a plurality of Radio Frequency (RF) electrodes configured to modulate an optical signal in the optical waveguide, wherein the RF electrodes include an RF crossing located at or near an end of the length and that is configured to equalize the optical signal. The optical signal is equalized via destructive interference after the RF crossing. At or near the end of the length, high frequencies of the optical signal are already strongly attenuated whereas low frequencies of the optical signal are not, such that the low frequencies are equalized after the RF crossing. The low frequencies can be below about half of modulator bandwidth. After the RF crossing, modulation amplitude is attenuated with little effect on the Electro-optic (EO) response. The length can include a set number of sections, and wherein the RF crossing is included in a section at or near the end of the length, where the section is selected based on an amplitude versus frequency response and a desired amount of equalization. The length can include an active low frequency section and an equalizer section disposed thereafter that includes the RF crossing. The optical modulator can be differentially driven where the plurality of RF electrodes include a signal electrode (S) and an inverse signal electrode ($\overline{S}$), wherein the signal electrode and the inverse signal electrode cross at the RF crossing. The plurality of RF electrodes can include three electrodes arranged to provide signal (S) and ground (G) to the plurality of modulator sections. The optical modulator can be one of a ferro electric-based modulator, a Quantum-Confined Stark Effect (QCSE), a Ge/SiGe Multiple Quantum Well (MQW) phase shifter, a Thin-Films Lithium Niobate (TFLN) modulator, a Barium titanate (BTO) modulator, and a pockel based Mach-Zehnder Modulator (MZM).

In another embodiment, a method of operating an optical modulator includes modulating an optical signal in an optical waveguide extending a length, via a plurality of Radio Frequency (RF) electrodes; and equalizing the modulated optical signal utilizing an RF crossing where the plurality of RF electrodes cross at or near an end of the length. The equalizing is via destructive interference after the RF crossing. At or near the end of the length, high frequencies of the optical signal are already strongly attenuated whereas low frequencies of the optical signal are not, such that the low frequencies are after the RF crossing. The length can include a set number of sections, and wherein the RF crossing is included in a section at or near the end of the length, where the section is selected based on an amplitude versus frequency response and a desired amount of equalization. The optical modulator can be differentially driven where the plurality of RF electrodes include a signal electrode (S) and an inverse signal electrode ($\overline{S}$), wherein the signal electrode and the inverse signal electrode cross at the RF crossing.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 shows a top view and FIG. 9 shows a perspective view with an equivalent circuit diagram.

FIGS. 21-25 are diagrams for the RF crossings illustrating possible crossing topologies when considering electrical signal propagation through conducting media separated by dielectrics.

DETAILED DESCRIPTION OF THE DISCLOSURE

Again, the present disclosure relates to a Radio Frequency (RF) in an optical modulator for equalization. The present disclosure includes an increase of the bandwidth (BW) of Travelling-Wave (TW) modulators, without increasing the modulator $V_{pi}$, or any significant optical loss, via a passive optical equalizer in the modulator design that includes an electrical crossing. As a result, the section after the crossing will add up to the optical wave via destructive interference thereby attenuating the modulation amplitude. This approach maximizes the modulation amplitude at a given frequency without creating a large EO response drop, i.e., the RF crossing has little effect on the EO response. In an embodiment, this approach is suited for low optical loss modulators (such as Thin-Films Lithium Niobate (TFLN), Barium titanate (BTO), Quantum-Confined Stark Effect (QCSE, Ge/SiGe Multiple Quantum Well (MQW) phase shifters, ferro electric-based, pockel based Mach-Zehnder Modulator (MZM), and the like) since the trade-off for the bandwidth is obtained by increasing the modulator length which increases the propagation losses; however, the approach described herein can also be applied to other type of TW modulators in other platforms.

Other Schemes to Attenuate Low Frequencies

Again, Yamaguchi, Yuya, et al. "Low-Loss Ti-diffused LiNbO 3 Modulator Integrated with Electro-Optic Frequency-Domain Equalizer for High Bandwidth Exceeding 110 GHz." 2022 European Conference on Optical Communication (ECOC). IEEE, 2022, describes some equalizer schemes proposed to attenuate the low frequencies and thus reducing the Electro-Optical (EO) degradation between low frequency and high frequency. Some of these equalizer schemes include an optical crossing, RF bends, ferroelectric domain inversion, and reverse polarity. In this paper, they propose to modify the modulator design to attenuate the low frequencies in order to reduce the EO degradation between low frequency and high frequency. In telecom applications, this equalization operation is usually done in the driver. The driver is adjusted to add some peaking at large frequencies. As a result, the gain at low frequency is reduced compared to the gain at high frequency which flatten the RF response of the concatenation.

Figure 1:
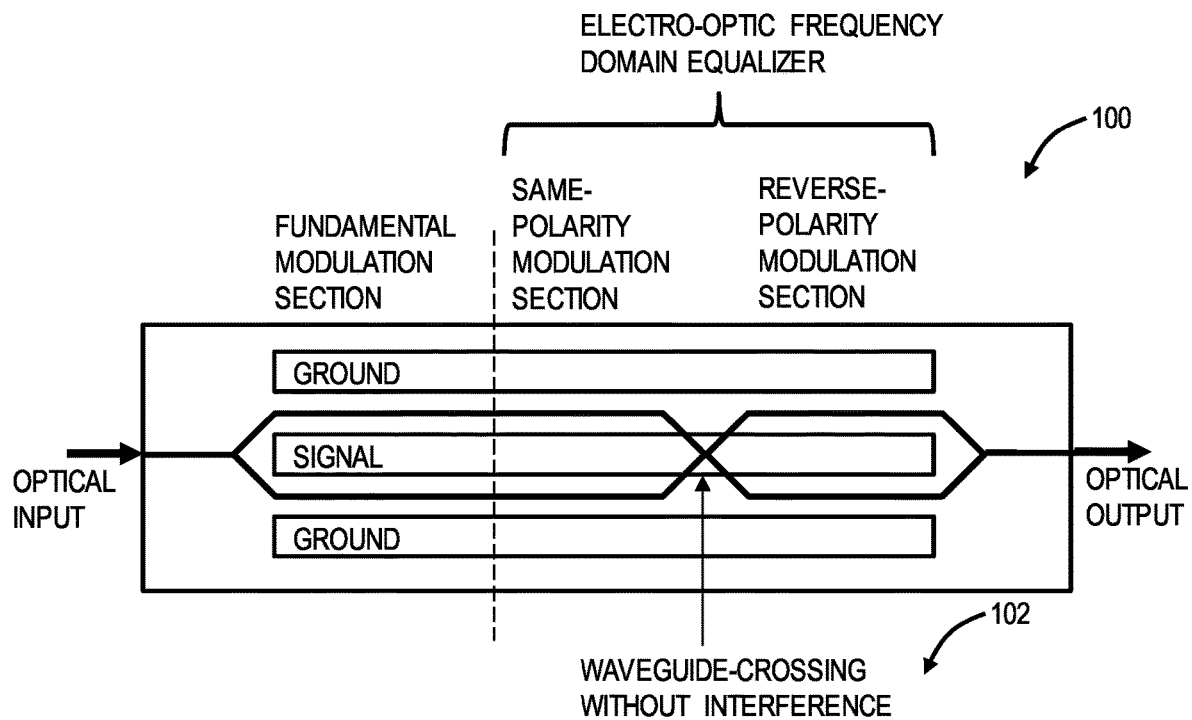
FIG. 1 is a diagram of an optical modulator with an optical crossing.

FIG. 1 is a diagram of an optical modulator 100 with an optical crossing 102. Using the optical crossing 102 introduces destructive interference for equalization. However, in most modulator technology, the velocity matching between the RF and optical signal is crucial and the relatively large distance that needs to be travelled in the crossing makes the RF/optical wave matching very difficult to achieve, even in a platform where the optical waveguide can bend very sharply such as in silicon photonics. Furthermore, optical crosstalk and reflection in the optical crossing might penalize the performance of the components.

Figure 2:
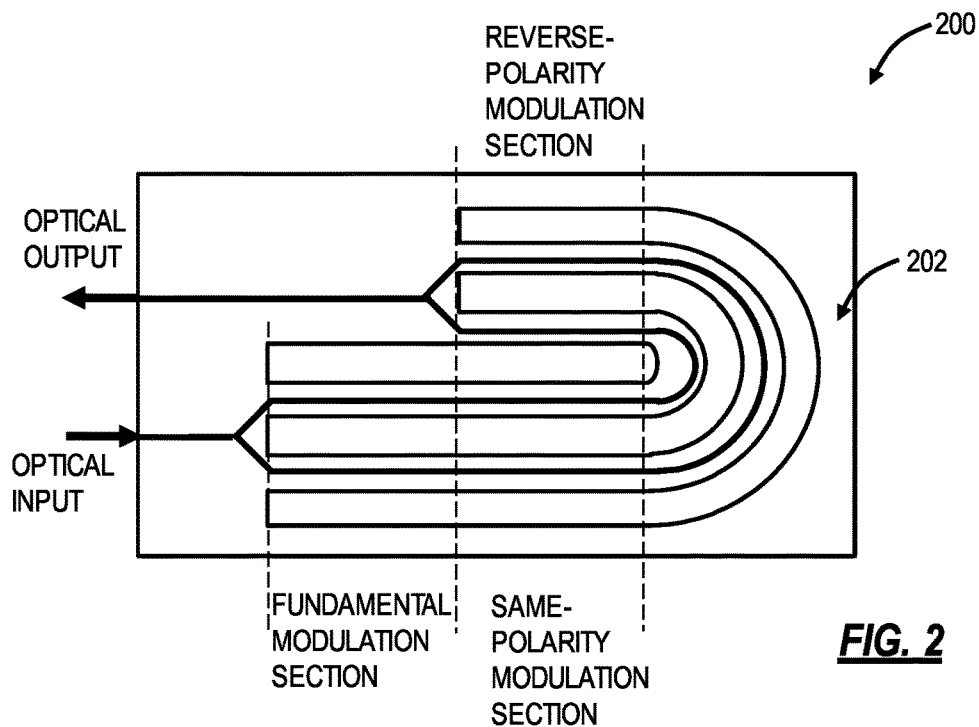
FIG. 2 is a diagram of an optical modulator with RF bends.

FIG. 2 is a diagram of an optical modulator 200 with RF bends 202. However, achieving RF bends is complicated and may result in components that are not compact which may not fit in small-form factor packaging. Furthermore, significant phase mismatch is created which might deteriorate the equalization performances.

Figure 3:
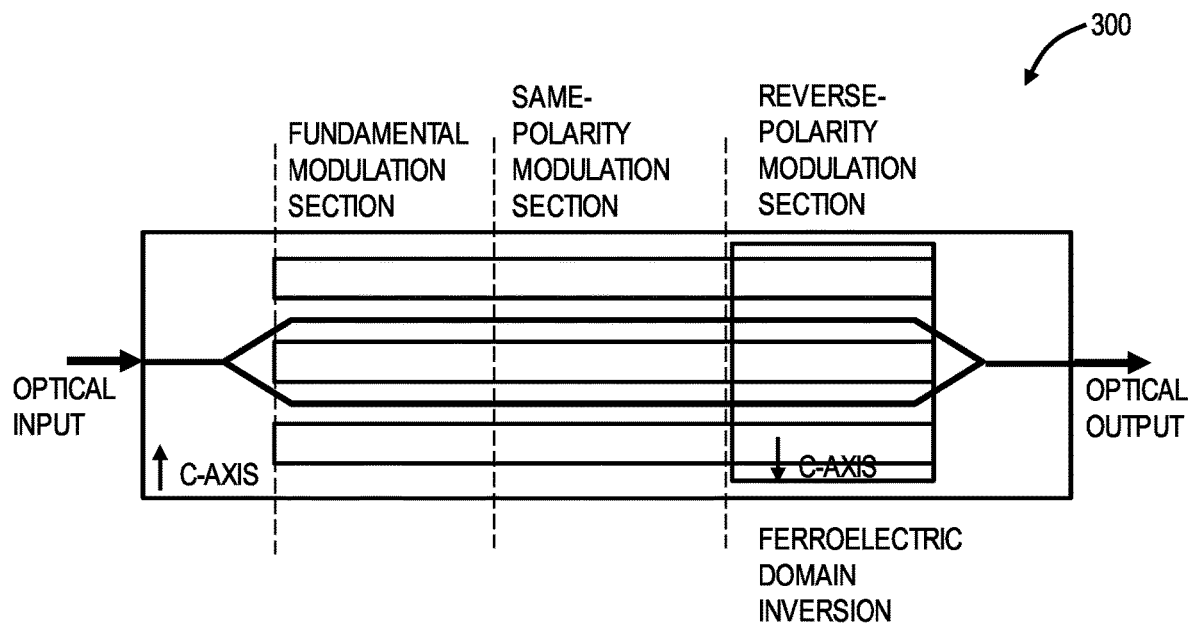
FIG. 3 is a diagram of an optical modulator with ferroelectric domain inversion.

FIG. 3 is a diagram of an optical modulator 300 with ferroelectric domain inversion. Inverting the domain of the ferroelectric crystal will create a destructive interference effect. However, this technique is more complex from the fabrication and poling aspect.

Figure 4A:
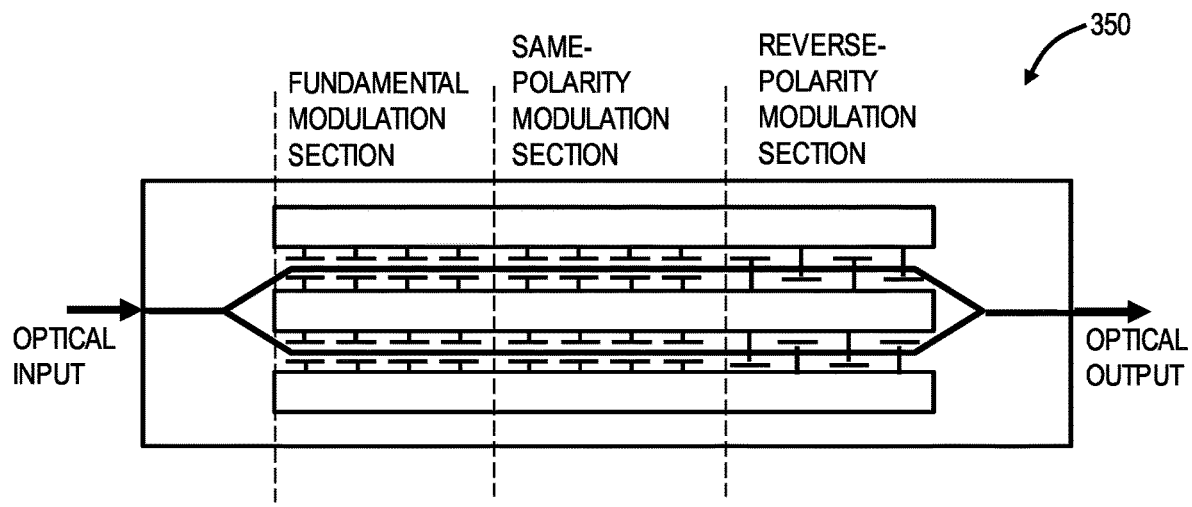
FIGS. 4A and 4B are diagrams of an optical modulator which includes reverse polarity.
Figure 4B:
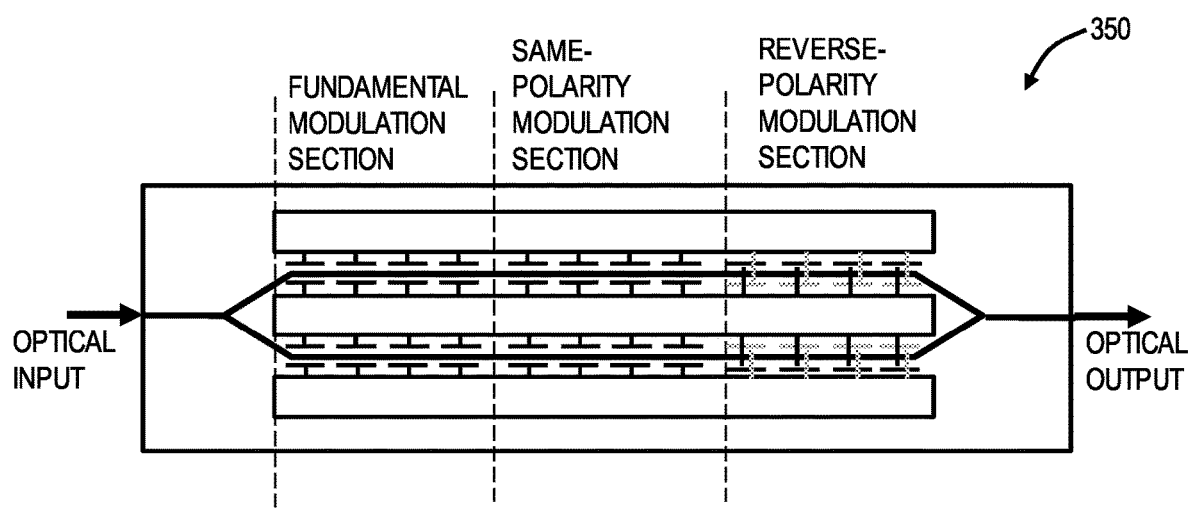

FIGS. 4A and 4B are diagrams of an optical modulator 350 which includes reverse polarity. This proposes to contact inverse the E fields between the T-section by interleaving the Ts in the reverse-polarity modulation section. This approach is described in U.S. Pat. No. 10,330,961, issued Jun. 25, 2019, and entitled "Optical modulator robust to fabrication errors," the contents of which are incorporated by reference.

RF Electrical Crossing

In general, an optical modulator includes multiple segments including modulator segments and a Radio Frequency (RF) crossing segment where RF lines extending a length of the modulator cross one another. As described herein, the optical modulator has a length that can be continuous, different segments, different sections, and the like. As described herein, the modulator length can be described as continuous, segments, or sections, all of which are equivalent. That is, the optical modulator can be realized or implemented in a continuous length as well as sections or segments. In the present disclosure, any implementation of the optical modulator is contemplated while the terms segment and section may be used herein, those skilled in the art will appreciate this can still be a continuous implementation where the terms segment and section are used to denote locations along the length of the optical modulator. Conversely, the optical modulator can be formed in sections or segments (note, the terms segment and section are interchangeable) and terms such as RF crossing segment are used to denote the location and the segment along the length of the optical modulator.

In an embodiment, the present disclosure can include optimization of one or more of a geometry of the RF crossing and a location of the RF crossing segment along the length. Again, the term RF crossing segment can be a physical location and/or a particular segment. The geometry is selected so that the RF crossing segment appears as another segment having similar characteristics as modulator segments. The location of the RF crossing segment is selected to balance out fabrication error and phase efficiency.

Background Relative to RF Electrical Crossing

Again, an important requirement of a modulator is that the arms display very similar phase modulation efficiency. Arms dissimilarity causes imbalance of the phase modulation which in turn creates a phase variation of an optical carrier (chirp) at the output of the modulator. Misalignment of the lithographic masks defining the p and n doped regions with regards to the optical waveguide will induce an imbalance in the modulation efficiency for both arms of the SPP MZ modulator.

Figure 5:
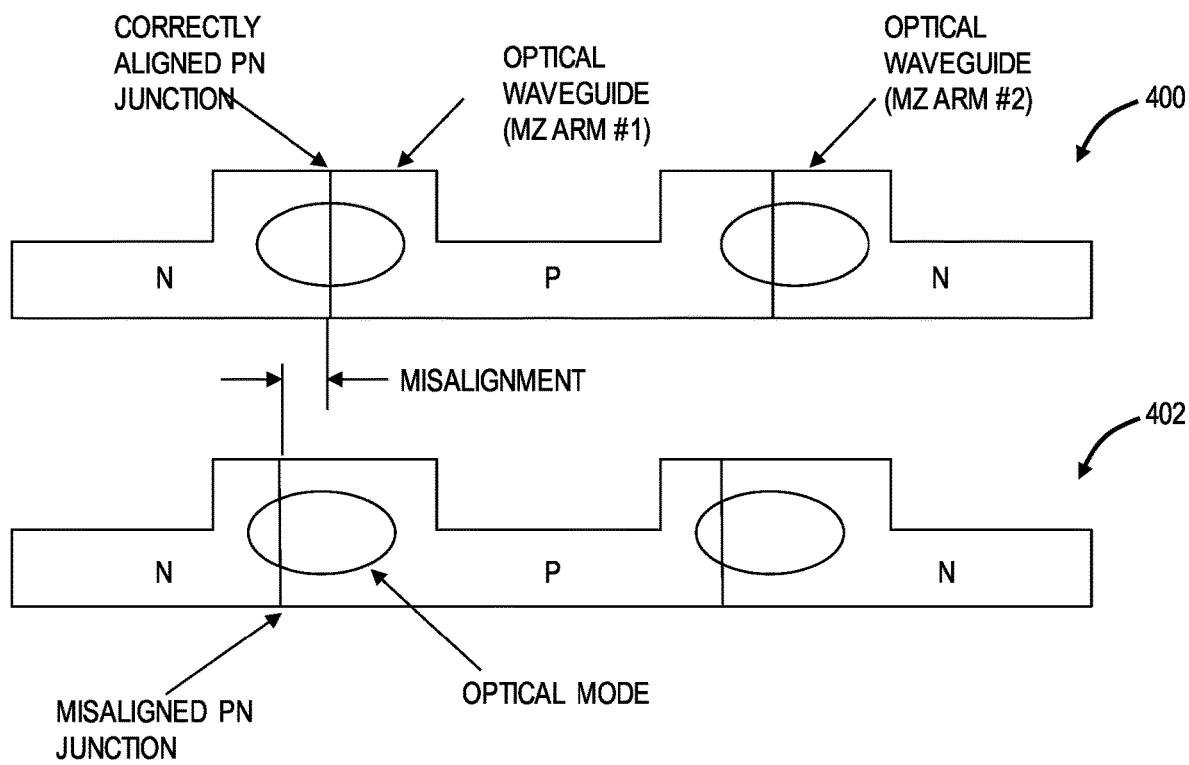
FIG. 5 is a side view/cross-sectional view showing PN junctions of a Series Push-Pull (SPP) Mach-Zehnder Modulator (MZM) modulator in a NPPN configuration when the lithographic masks are well aligned and the PN junctions when the masks defining the P and N doped regions are misaligned with respect to their ideal position in a SPP MZM modulator.

FIG. 5 is a side view/cross-sectional view showing PN junctions of a Series Push-Pull (SPP) Mach-Zehnder Modulator (MZM) modulator 400 in a NPPN configuration when the lithographic masks are well aligned and the PN junctions when the masks defining the P and N doped regions are misaligned with respect to their ideal position in a SPP MZM modulator 402. For the modulator 400, the PN junction is located in the center of each optical waveguides. The modulation of the depletion width of this PN junction affects the portion of the optical mode overlapping with it, which will be, in this case, the same for each optical waveguide. In the modulator 402, this offset of the PN junctions leads to the optical mode interacting with a larger portion of p-doped material on the waveguide at left (MZ arm #1) and with a larger portion of n-doped material on the waveguide at right (MZ arm #2). As the index variation associated to the modulation of the p and n-dope d material is different, the modulation efficiency for the two MZ arms will also differ, causing modulation imbalance.

Addressing Misalignment

Figure 6:
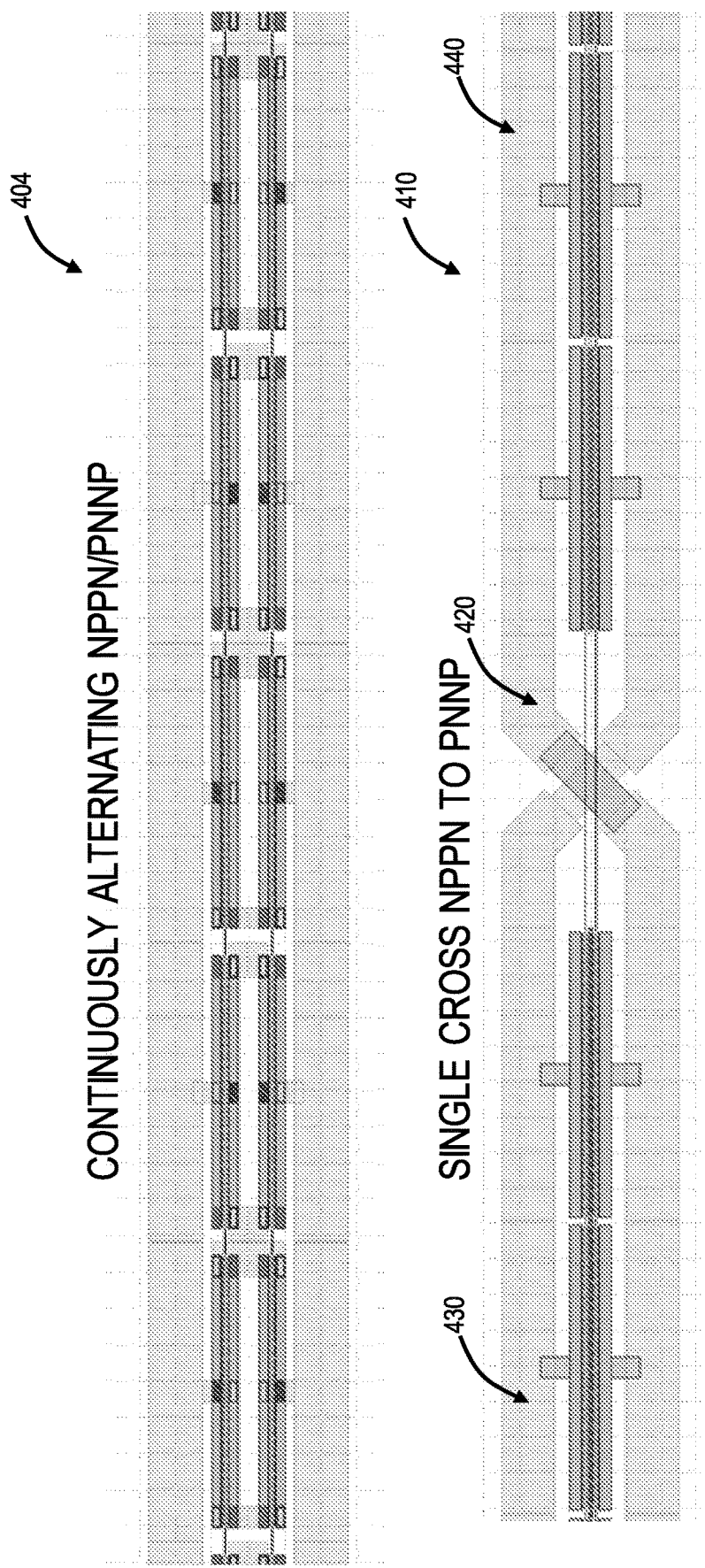
FIG. 6 shows a diagram of an optical modulator having continuously alternating NPPN to PNNP sections and an optical modulator in in accordance with one or more embodiments having an RF line crossing between NPPN segments and PNNP segments.

Different approaches to address this misalignment include asymmetrical biasing as described in U.S. Pat. No. 10,908,474, filed issued Feb. 2, 2021, and entitled "Optical modulator and optical modulator driver devices and methods utilizing independent arm bias to mitigate fabrication errors," the contents of which are incorporated by reference herein in their entirety, or, as described herein in U.S. Pat. No. 10,330,961, via segmentation of the modulator by alternating each segment between nppn to pnnp to average out the imbalance. FIG. 6 shows a diagram of an optical modulator 404 having continuously alternating NPPN to PNNP sections and an optical modulator 410 in in accordance with one or more embodiments having an RF line crossing 420 between NPPN segments 430 and PNNP segments 440. Specifically, the modulator 410, instead of continuously alternating junctions (after each NPPN or PNNP segment) along the entire length of a segmented modulator, includes the RF line crossing 420. Thus, for a given length of the modulator 410, half of the modulator 410 assumes a NPPN configuration with the NPPN segments 430 and PNNP for the remainder with the pnnp segments 440. Also, it can be noted that the RF line crossing 420 is effectively a single segment itself along with the NPPN segments 430 and the PNNP segments 440.

The single crossing has the benefit of having a lower RF response impairment compared to a continually alternating design due to no additional metal work required other than the one crossing. However, the single crossing comes at the expense of a frequency dependent RF imbalance, whereas a continually alternating design has no frequency dependent RF imbalance. The design of the RF line crossing 420 is described in further detail herein to discuss the frequency dependent RF imbalance.

RF Line Crossing and PN Junction Orientation Inversion

Figure 7:
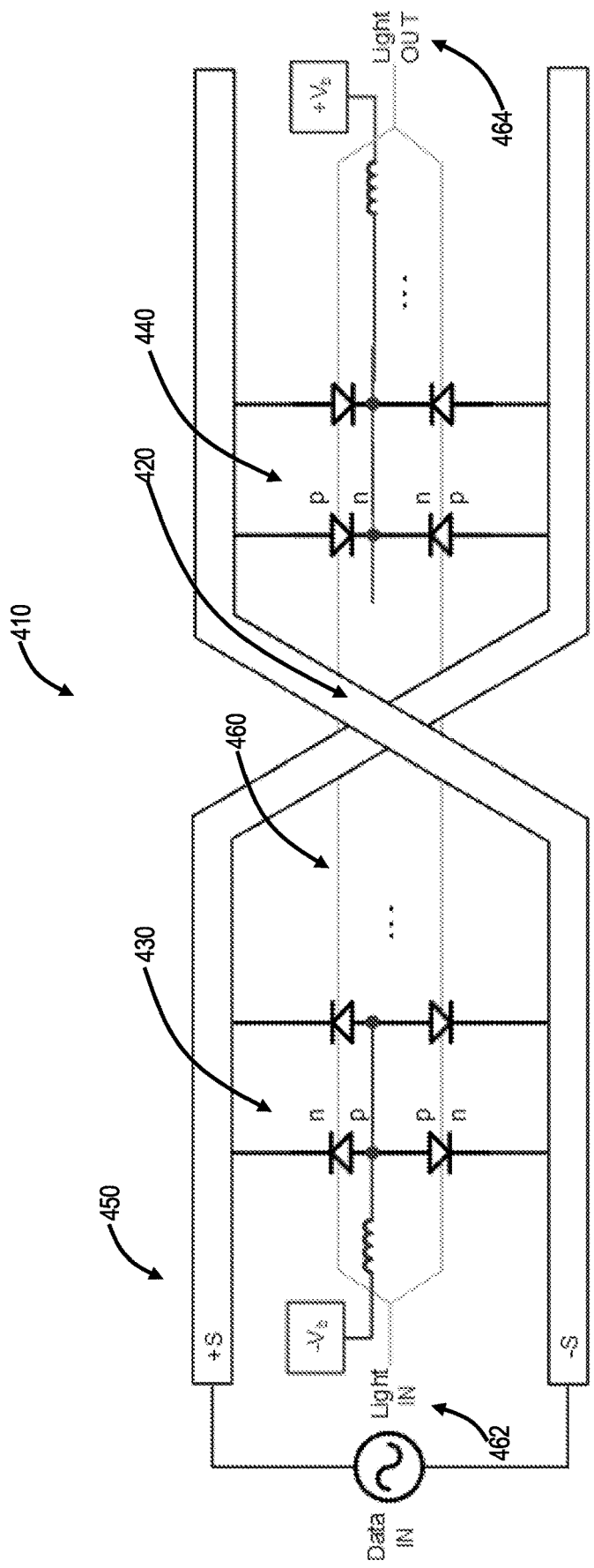
FIG. 7 shows a circuit diagram of the optical modulator including the RF line crossing and an inversion of the orientation of the PN junction at the RF line crossing.

FIG. 7 shows a circuit diagram of the optical modulator 410 including the RF line crossing 420 and an inversion of the orientation of the PN junction at the RF line crossing 420. Specifically, one side of the modulator 410 includes the NPPN segments 430 and the other side demarcated by the RF line crossing 420 includes the PNNP segments 440, i.e., for the inversion of the orientation. Therefore, PN junctions located to the left of the RF line crossing 420 will have the same orientation, as a NPPN configuration requiring a negative bias voltage for high-speed operation under depletion. On the other end, PN junctions located to the right of the RF line crossing 420 are in a PNNP configuration and require a positive bias voltage.

As described herein, orientation means how the PN junctions are in terms of N type and P type regions in each segment. This is visually presented in the equivalent circuit diagrams by the diode orientation. For example, in FIG. 7, the segments 430 include a NPPN configuration whereas the segments 440 include a PNNP configuration. This is presented for illustration purposes, and those skilled in the art will recognize any of the alternating orientations described herein can be used with the RF line crossing 420.

RF line crossing 420 can be implemented using bridges (via) connecting two layers of metal at different height in the chip stack-up, allowing one metal electrode to go under the other. The electrode and via layout at the crossing point can be optimized so that the drawback of doing the RF line crossing 420 are eliminated or attenuated. The drawback of RF line crossing 420 is possible degradation in RF response that may need some RF design optimizations. Metal line width and geometry are factors that can be used to make this optimization, as is described in further detail herein. Also, the RF crossing 420 does not necessarily have to be on the die, it can also be performed off die, such as, for example on an interposer or substrate, as long as the velocity match (delay) between the RF and optical waves is maintained.

The location of the RF line crossing 420 need not be at the modulator 410 center. Optimization of the modulator extinction ratio (ER) would favor using a crossing point midway between RF line input and output so as to have an equal number of PN junctions oriented in one direction before and after the crossing point. This would equalize the PN junction loss in the event that the doping regions are misaligned. Alternatively, one could favor RF imbalance optimization, which would require shifting the crossing point towards the input because the RF signal gets attenuated as it propagates on the RF line (so more PN junctions are required after the RF line crossing 420 to get the same phase efficiency at a given frequency or frequency optimization point as that provided by the PN junctions located before the crossing point, i.e., the PNNP segments 440 are longer than the NPPN segments 430). Note that the number of PN junction segments before and after the RF crossing point need not be equal, depending on the optimization strategy.

In an embodiment, the PN junctions can be in segments periodically connected to an RF line 450 (denoted by +S and −S), or, in another embodiment, continuously connected along the RF line 450.

In another embodiment, more than one crossing points could be used to allow both the equalization of optical loss and removal of the RF imbalance.

Also, the RF delay accumulated in the crossing area of the RF line crossing 420 could be large enough to require the addition of an optical delay to ensure the RF wave is still in-phase with the optical phase after the crossing.

One skilled in the art will understand that any combination of physical arrangements for the PN junctions, their interconnection to one another and to the RF transmission line, as described in U.S. Pat. No. 10,330,961, can be imagined and still fall under the umbrella of the present disclosure.

Bias voltage polarities are such as to provide operation in depletion mode of the PN junction (for fastest operation speed). But one could operate the modulator 410 using arbitrary voltage polarity, provided that the polarity is reversed at the crossing point.

The bias voltage can be brought to the PN junctions as illustrated in FIG. 7 (i.e., from the left for the first section at left, and from the right for the second section at right) but any other configuration/combination could be used as well [for example, it could come from the north side (top) instead of from the west side (left)]. The bias voltage could also be brought directly to the center of a section using proper bridges or doped silicon layers.

The polarity of the PN junctions before and after the RF crossing (i.e., configuration NPPN or PNNP) is arbitrary and depends on the application and on the type of modulator driver used. For example, it is possible to have PNNP on the left side and NPPN on the left side, with corresponding change in the bias voltages, i.e., the segments 430, 440 reversed.

The RF line 450 could also be of another type other than a coplanar strip. For example, external ground lines could be added to realize a GSSG (ground-signal-signal-ground) RF line configuration, potentially enabling attachment of components between the signal and ground electrodes at the transition point to optimize the response. Moreover, in such case, components (discrete or integrated) could be attached to the RF line at the crossing point to tune the modulator frequency response, as desired.

Optical Modulator

In FIG. 7, in an embodiment, an optical modulator 410 includes a first Radio Frequency (RF) line 450 (+S) and a second RF line 450 (−S); an optical waveguide 460 along the length with an input (light in 462) and an output (light out 464); and a plurality of segments 420, 430, 440 including a first set of PN junctions 430, an RF line crossing 420, and a second set of PN junctions 440, wherein the first set of PN junctions 430 and the second set of PN junctions 440 have an inversion of their respective orientation at the RF line crossing 420 and wherein the RF line crossing is located at a crossing segment that is not a center segment of the plurality of segments, and wherein each of the first RF line 450 (+S) and the second RF line 450 (−S) extend a length of the modulator 410 and cross one another at the RF line crossing 420.

A location of the crossing segment can be based on an average loss or sum of voltages over a band of interest. A location of the crossing segment can be selected based on RF imbalance caused by the RF line crossing. The crossing segment can be located closer to the input than the output along the length.

A geometry of the RF line crossing can include any of a length of unloaded lines, a width of the unloaded lines, and an angle of crossing lines connected to respective unloaded lines, and wherein the part or all of the geometry can be selected such that one or more characteristics of the crossing segment are similar to corresponding one or more characteristics of modulator segments of the plurality of segments. The one or more characteristics can include any capacitance, inductance, impedance, and dielectric constant.

Each segment in the first set of PN junctions can have a same orientation, and each segment in the second set of PN junctions has a same orientation different from the orientation of the first set of PN junctions. One or more segments in the first set of PN junctions can have a different orientation from one another, and one or more segments in the second set of PN junctions has a different orientation from one another. The respective orientation in each of the first set of PN junctions and the second set of PN junctions can be one of a NPPN configuration and a PNNP configuration. Each segment of the plurality of segments can have about a same length, and wherein the RF line crossing has the same length. Each segment except the crossing segment of the plurality of segments can be connected to the first RF line and the second RF line.

In another embodiment, an optical modulator includes a first Radio Frequency (RF) line and a second RF line; an optical waveguide along a length of the modulator with an input and an output; and a plurality of segments along the length including a first set of PN junctions, an RF line crossing at a crossing segment, and a second set of PN junctions, wherein the first set of PN junctions and the second set of PN junctions have an inversion of their respective orientation at the RF line crossing, wherein each of the first RF line and the second RF line extend along the length and cross one another at the RF line crossing, and wherein a geometry of the RF line crossing includes any of a length of unloaded lines, a width of the unloaded lines, and an angle of crossing lines connected to respective unloaded lines, and wherein the part or all of the geometry is selected such that one or more characteristics of the crossing segment are similar to corresponding one or more characteristics of modulator segments of the plurality of segments. The one or more characteristics can include any capacitance, inductance, impedance, and dielectric constant.

In a further embodiment, the optical modulator 410 includes a plurality of segments 420, 430, 440 disposed along a length of the modulator 410; a first Radio Frequency (RF) line 450 (+S) and a second RF line 450 (−S), each on opposite sides of the plurality of segments 420, 430, 440; an optical waveguide 460 along the plurality of segments 420, 430, 440 with an input 462 and an output 464; and an RF line crossing 420 at one of the plurality of segments where the first RF line 450 (+S) and the second RF line 450 (−S) switch sides, and wherein the plurality of segments include a first set of PN junctions 430 and a second set of PN junctions 440, wherein a segment of the first set of PN junctions and a segment of the second set of PN junctions have an inversion of their respective orientation at the RF line crossing 420.

RF Line Crossing Design Considerations

For high frequency signaling and high bit-rates, it is imperative to keep the speed of light propagation along the optical waveguide 460 the same as the speed of the electrical modulation signals along the length of the MZM modulator 410. The electrical speed along the electrical RF rail line 450 is determined by the total capacitance and the equivalent inductance of the transmission line per unit length, namely Electrical Propagation Speed $v_e \propto \sqrt{L_e C_e}$ At the crossing point, the capacitance and inductance of the line is controlled by its transmission line geometry and the Silicon die stackup (buildup of various metallization and dielectric layers). At the design of the RF crossing section, the geometries are designed in such a way that the equivalent capacitance and inductance ratio and product is comparable to the original transmission lines loaded with active region electrodes so that the resulting characteristic impedance and propagation speeds remain as close as possible to the loaded transmission lines along the rest of the modulator region, namely $$\text{Characteristic Impedance } z_e \propto \sqrt{\frac{L_e}{C_e}}$$

Figure 8:
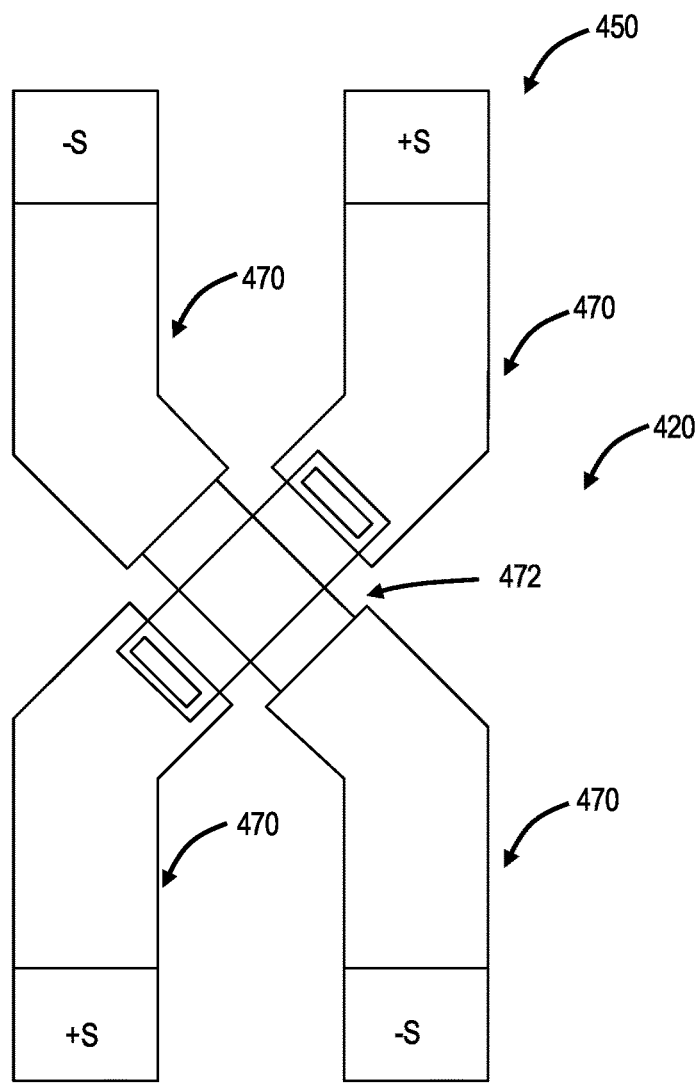
FIGS. 8 and 9 are close-up views of the RF line crossing design.
Figure 9:
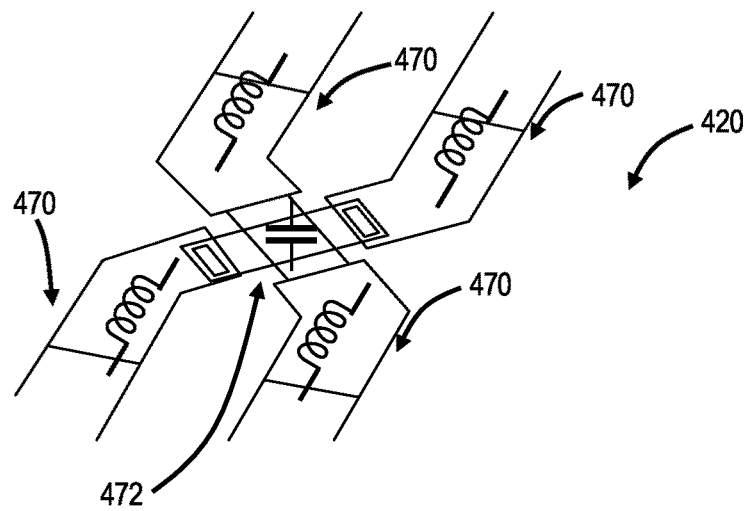

FIGS. 8 and 9 are close-up views of the RF line crossing 420 design. FIG. 8 shows a top view and FIG. 9 shows a perspective view with an equivalent circuit diagram. Of note, the RF lines 450 are crossed at the RF line crossing 420, with the top rail +S switching to the bottom rail, and the bottom rail −S switching to the top rail. At the RF line crossing 420, one of the rails is configured to traverse under the other rail.

The geometry of the RF line crossing 420 design is selected to provide a characteristic performance very close to the actual modulator segments 430, 440, therefore expecting a smoother ripple performance. Aspects of the geometry include having a segment including the RF line crossing 420 having an approximate equal length as the segments 430, 440. Other aspects include the crossing angles, length, etc.

In FIGS. 8 and 9, the RF crossing 420 includes unloaded lines 470 and crossing lines 472. In FIG. 9, the equivalent circuit diagram illustrates the unloaded lines 470 are dominated by inductance whereas the crossing lines 472 are dominated by capacitance. The RF crossing 420 is one segment of the multiple segments 430, 440 in the optical modulator 410. Note, the segment with the RF crossing 420 does not perform modulation. But an objective of the present disclosure is that the segment with the RF crossing 420 behaves similarly as the actual modulator segments 430, 440. That is, characteristics of the RF crossing are engineered so the segment with the RF crossing 420 behaves similarly as the actual modulator segments 430, 440. These characteristics can include one or more of effective dielectric constant, capacitance per unit length, inductance per unit length, propagation speed, and differential impedance ($Z_0$) versus frequency. The propagation speed includes having a delay in the RF crossing that maintains a same delay as the actual modulator segments 430, 440.

The geometry of the segment with the RF crossing 420 includes a width (narrowness) of the unloaded lines 470, a length of the unloaded lines 470 outside of the actual crossing (where the crossing lines 472 intersect), angles of the crossing lines 472, and the like. Again, the geometry here is selected so the characteristics are similar to that of the actual modulator segments 430, 440. In an embodiment, the width (narrowness) of the unloaded lines 470 and the length of the unloaded lines 470 outside of the actual crossing is used to put preference on inductance to offset the capacitance of the crossing lines 472 lines primarily determined by of the metal overlap area. That is, the width and length of the unloaded lines 470 is selected to have an inductance to offset the capacitance of the crossing lines 472. Further, it is possible to include other metal features around the crossing lines 472, such as floating metal structures, where the other metal features contribute to frequency dependent characteristics. Those skilled in the art will recognize there are various approaches to changing the geometry of the RF crossing 420 to match the characteristics, and all such approaches are contemplated herein. Also, those skilled in the art will recognize the characteristics are determined based on a frequency of interest.

In determining the geometry, the characteristics of the modulator segments 430, 440 are extracted and the geometry of the RF crossing 420 is simulated to compare with the extracted characteristics. Different values of the geometry (e.g., any of a length of unloaded lines 470, a width of the unloaded lines 470, metal features around the crossing lines 472, and an angle of crossing lines 472 connected to respective unloaded lines 470) are analyzed and compared to the extracted characteristics to find similarity. Those skilled in the art will appreciate this can be performed with a simulation tool or the like.

Location of the RF Line Crossing

Figure 10:
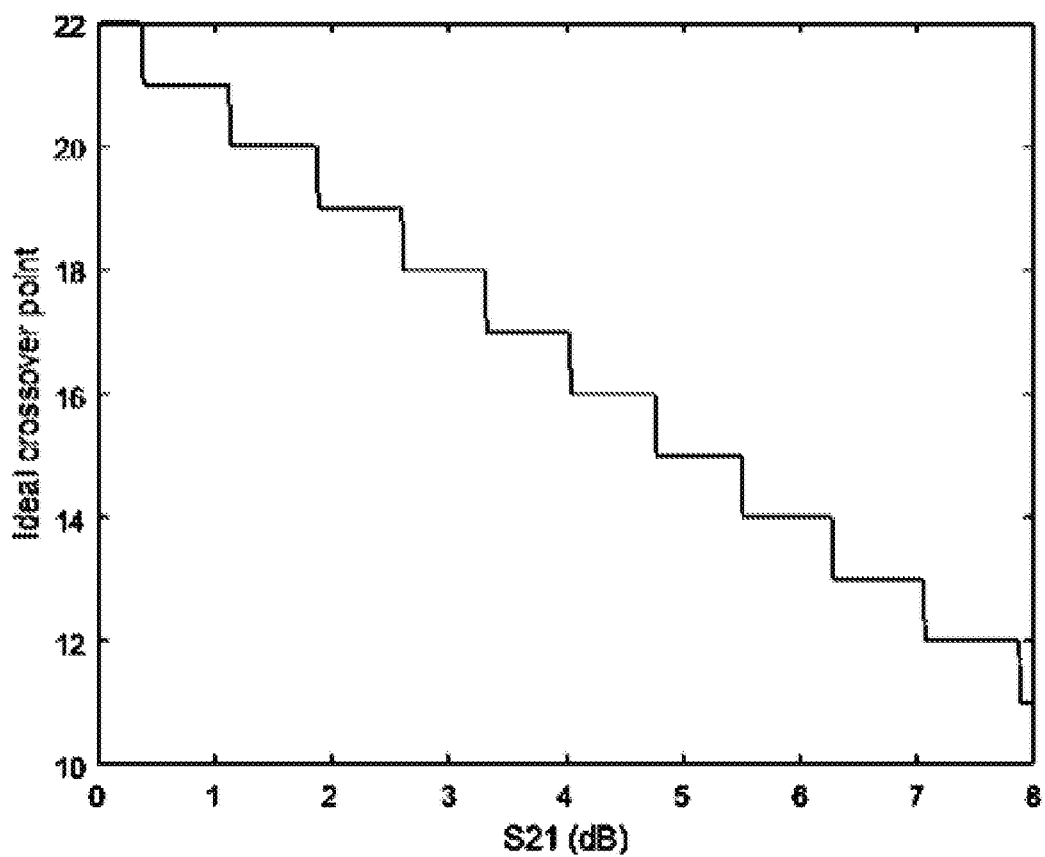
FIG. 10 is a graph of the ideal crossover point for the RF line crossing relative to the S21 parameter (forward gain voltage).

FIG. 10 is a graph of the ideal crossover point for the RF line crossing 420 relative to the S21 parameter (forward gain voltage). The location of the RF line crossing 420 is as critical as the RF crossing 420 geometry design itself since it balances out the fabrication error and phase efficiency of the two arms (RF lines). Choosing the RF crossing at 50% of the length, i.e., at a center segment, offers the best balance at DC, resulting in the highest Extinction ratio. However, this is not the most optimal position for the RF, since the single crossing results in a frequency dependent RF imbalance. For example, an optical signal in the first half of the modulator 410 will experience more modulation from the modulator segments 430 than in the second half from the modulator segments 440.

Thus, in addition to optimizing the geometry of the RF crossing 420, the present disclosure includes locating the RF crossing 420 not in the center or intermediate segment. The optimum location of the RF line crossing 420 is to find the average loss or the sum of the voltages over the band of interest. So that the sum of the voltages of the segment before the crossing has the same sum after the crossing. For example, in the FIG. 10, if the average loss was 3 dB for a 44 Segment modulator, the optimal crossing would occur after the 18th segment, i.e., 18 segments before the crossing and 24 segments after.

EXPERIMENTAL RESULTS

Figure 11:
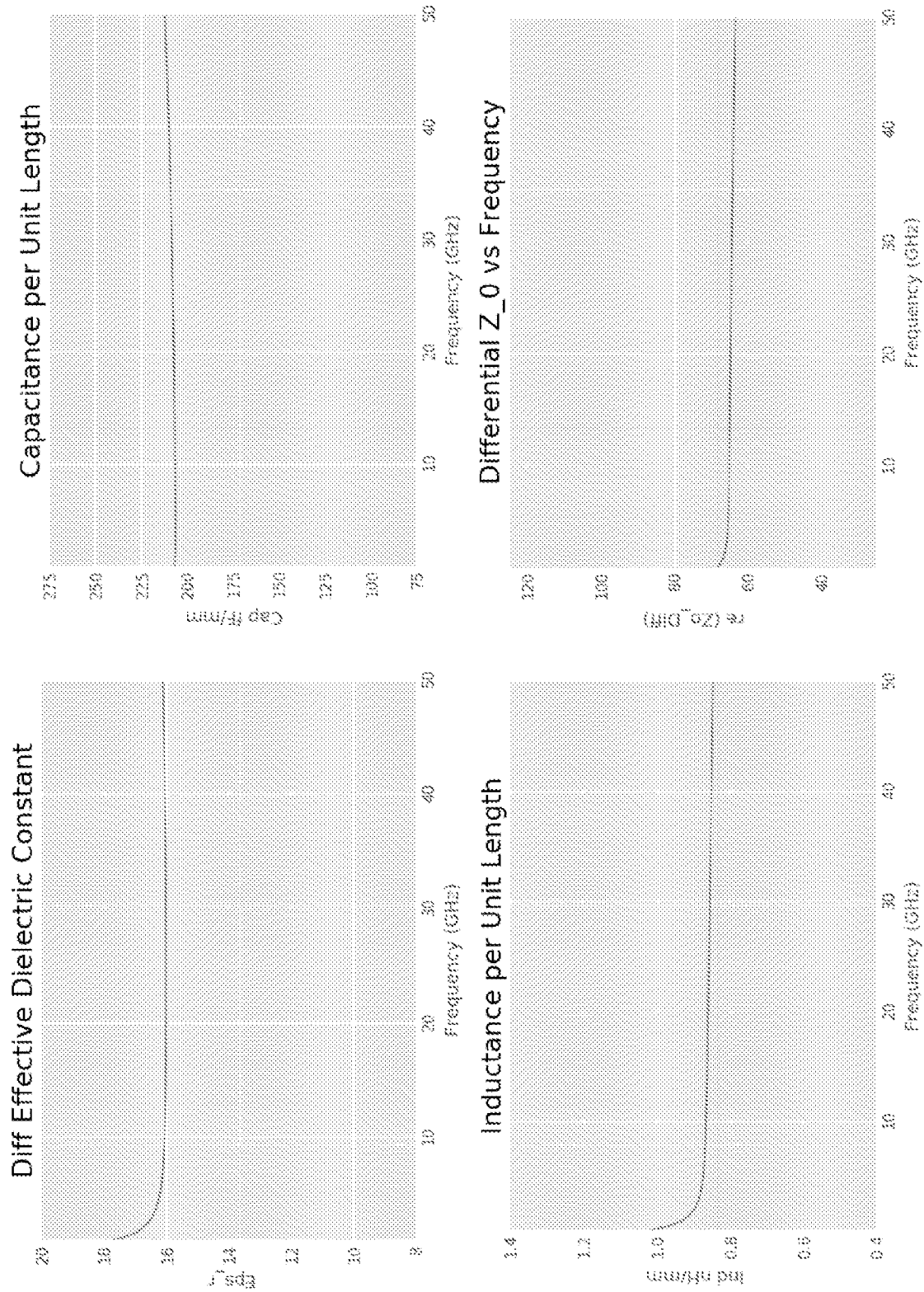
FIGS. 11 and 12 are graphs illustrating per unit length characteristics of the modulator segment (FIG. 11) with the RF line crossing relative to the modulator segment (FIG. 12) without the RF line crossing.
Figure 12:
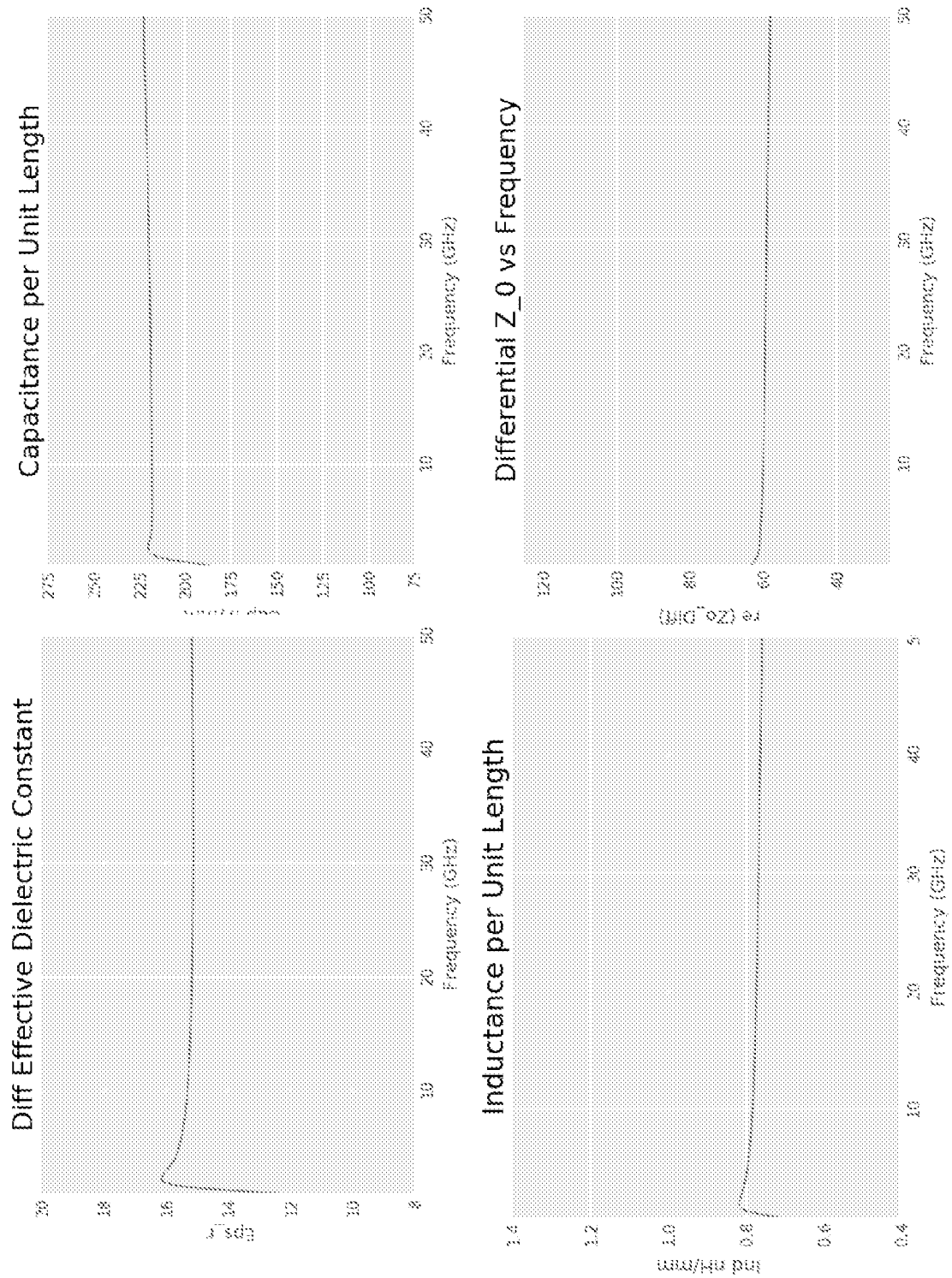
Figure 13:
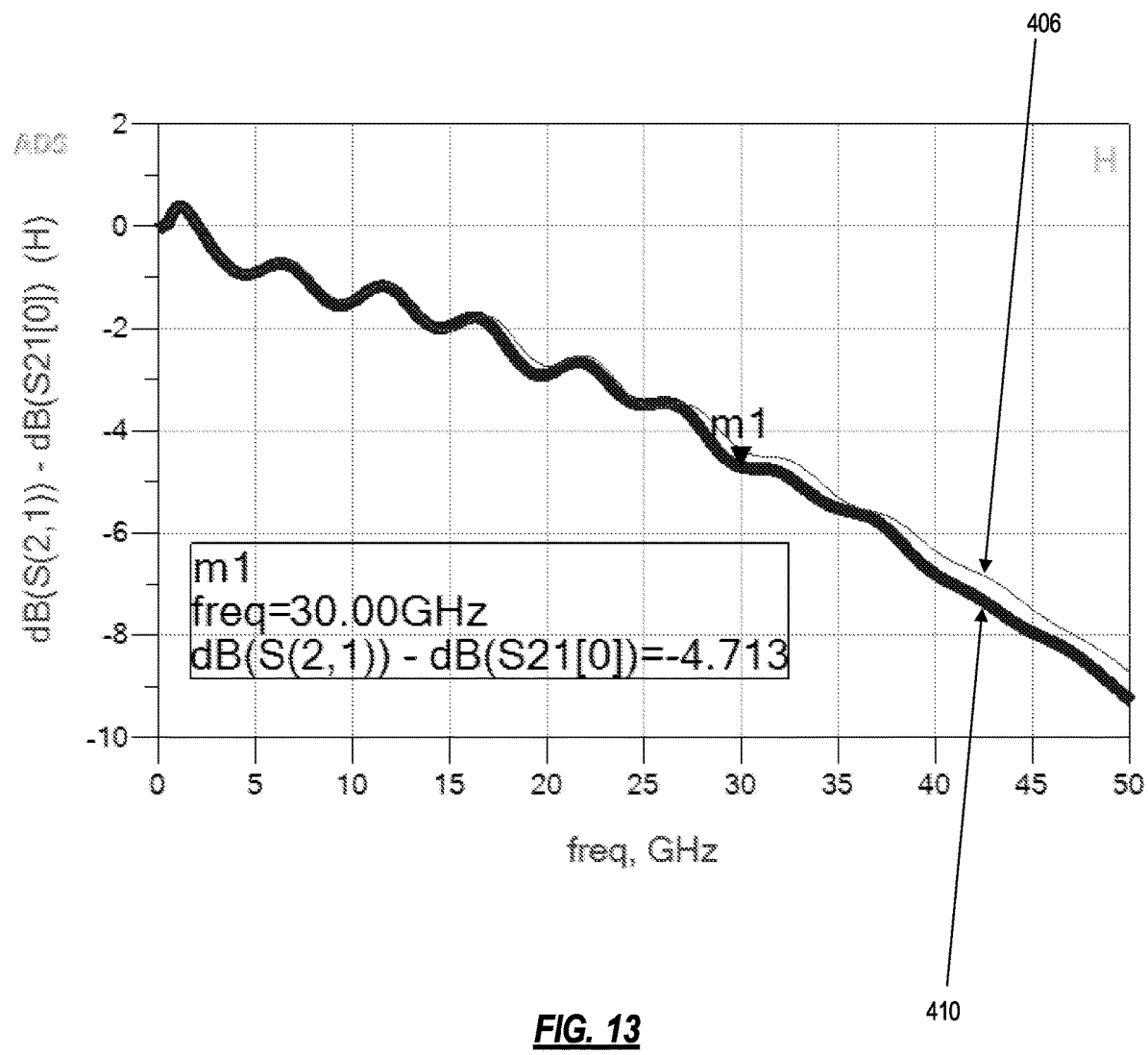
FIG. 13 illustrates a graph of a 44-segment modulator comparing the performance of the modulator and the modulator.

FIGS. 11 and 12 are graphs illustrating per unit length characteristics of the modulator segment (FIG. 11) with the RF line crossing relative to the modulator segment (FIG. 12) without the RF line crossing. Here, the modulator 410 is the one in FIG. 8, and it is noted the performance is consistent with the modulator 406. Here, it is shown the different characteristics were set for the segment with the RF crossing 420 such that the behavior is similar to that of the actual modulator segment. FIG. 13 illustrates a graph of a 44-segment modulator comparing the performance of the modulator 410 and the modulator 406.

RF Line Crossing Goal

In the previous description, the goal was to use the RF crossing 420 to cancel-out $V_{pi}$ or the optical loss (OL) imbalance caused by mis-aligned masks. This RF crossing 420 is flipping the S/Sbar electrode. To ensure that the modulation keeps adding up in phase in the modulator segments after the RF crossing 420, the PN junction after the RF crossing 420 are reversed.

RF Line Crossing for Equalization

The foregoing use of the RF crossing 420 was used to cancel-out $V_{pi}$ or the optical loss (OL) imbalance caused by mis-aligned masks. Inventors have another objective and use for the RF crossing, namely, in another embodiment, the present disclosure aims to increase the bandwidth (BW) of travelling-wave (TW) modulators, using the RF crossing for equalization, without increasing the modulator $V_{pi}$ or any significant optical loss. Again, this approach is suited for low optical loss modulators (such as thin-films lithium niobate (TFLN), Barium titanate (BTO), Quantum-Confined Stark Effect (QCSE), Ge/SiGe Multiple Quantum Well (MQW) phase shifters, ferro electric-based, pockel based Mach-Zehnder Modulator (MZM), and the like) since the trade-off for the BW is obtained by increasing the modulator length which increases the propagation losses although it can also be applicable to other type of TW modulators in other platforms.

In this embodiment, we propose to include a passive optical equalizer in the modulator design by incorporating an RF electrical crossing in the modulator design. As a result, the section (again, or segment or location along the optical modulator) after the crossing will add up to the optical wave in a destructive interference manner. The modulation amplitude will thus be attenuated. However, if this crossing is made at a location near the end of the modulator, the high frequency components will already be strongly attenuated. So, at high frequencies, the attenuation caused by the crossing will be negligible. However, at low frequencies, this is not the case which will result in a passive optical equalizer. The terms high and low frequencies relate to the modulator bandwidth with the terms high and low used to describe the relative frequencies to one another. In an example, the low frequencies can be about half or slightly more than half of the modulator bandwidth. The destructive interference is at the low frequencies. For example, with a modulator bandwidth of about 120 GHz, the destructive interference is at 60 GHz and below.

Optical losses, electro-optic (EO) response (or bandwidth (BW)) and $V_{pi}$ are usually the three modulators metrics that need to be traded-off in any given design.

The present disclosure, utilizing the RF line crossing for equalization, i.e., destructive interference at the low frequencies, includes two options depending on the trade-offs, namely a first option where the optical losses are kept constant, and a second option where $V_{pi}$ is kept constant.

Option 1: Keeping the Optical Losses Constant

Figure 14:
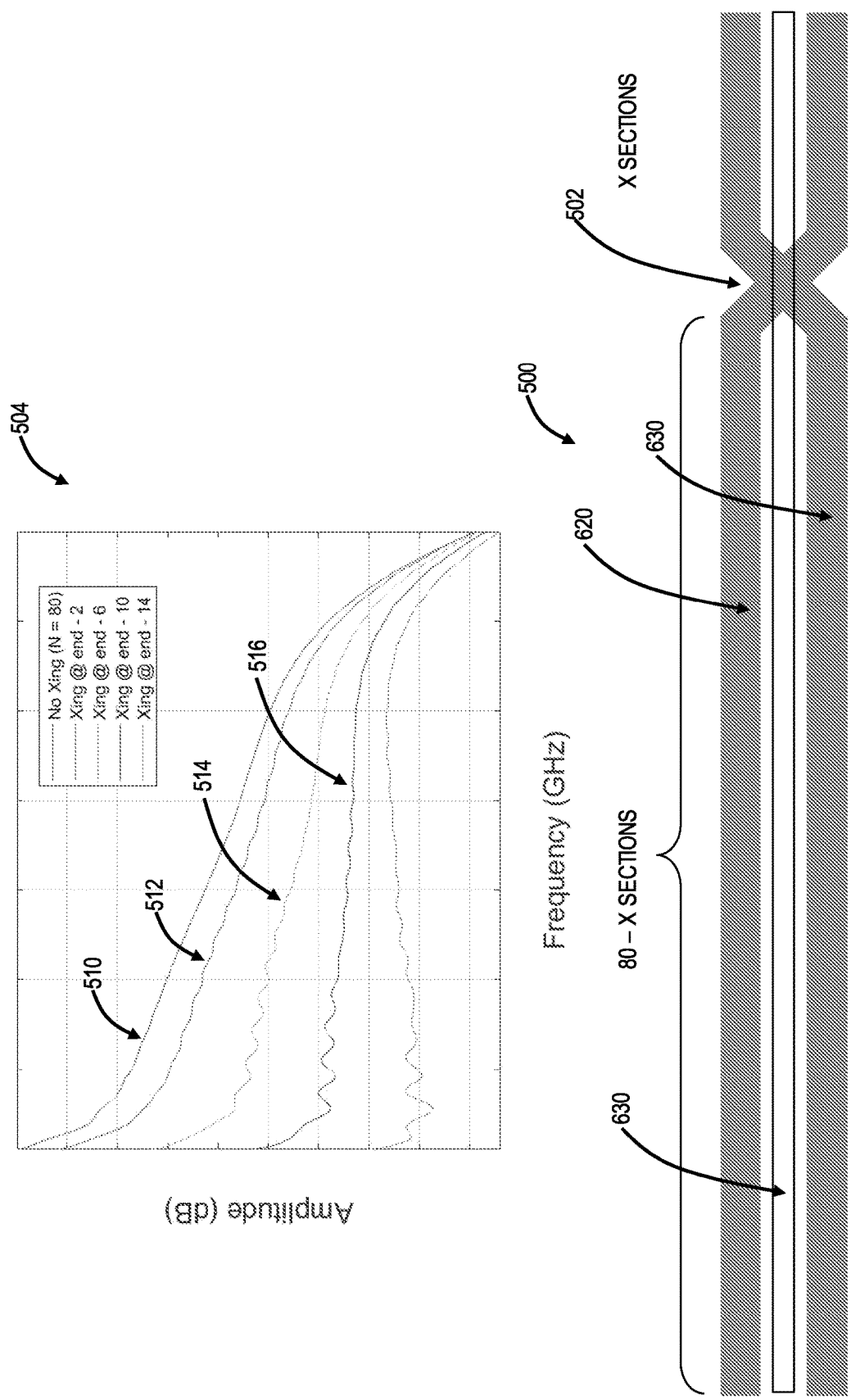
FIG. 14 is a diagram of an optical modulator with a constant length and with an RF crossing towards the end for equalization, along with a graph that illustrates differences in the location of the RF crossing.

For the optical losses to remain constant, the modulator length must remain constant. As a result, the price to pay to improve the EO bandwidth in this implementation will be a $V_{pi}$ increase. FIG. 14 is a diagram of an optical modulator 500 with a constant length and with an RF crossing 502 towards the end for equalization, along with a graph 504 that illustrates differences in the location of the RF crossing 502. To demonstrate the impact of this approach, simulations were run for the optical modulator 500 composed of 80 (arbitrarily long) segments with the RF crossing 502 that is placed at a few locations near the end of the modulator 500, namely X segments from the end. Note, as described herein, the terms "segment" and "section" are used interchangeably, namely to indicate some portion or location of the optical modulator 410, 500, 600. Again, the optical modulator 500 can be continuous as well as implemented via segments or sections.

The graph 504 illustrates different values of X. A curve 510 illustrates a case where there are no crossings; a curve 512 has two segments after the crossing before the end of the modulator, a curve 514 has six segments after the crossing, and so on. It can be seen that the crossing is indeed attenuating the DC portion of the spectrum (a curve 516 have a $V_{pi}$ increase of about 40%, but the EO response will be much flattened).

Option 2: Keeping the $V_{pi}$ Constant

Figure 15:
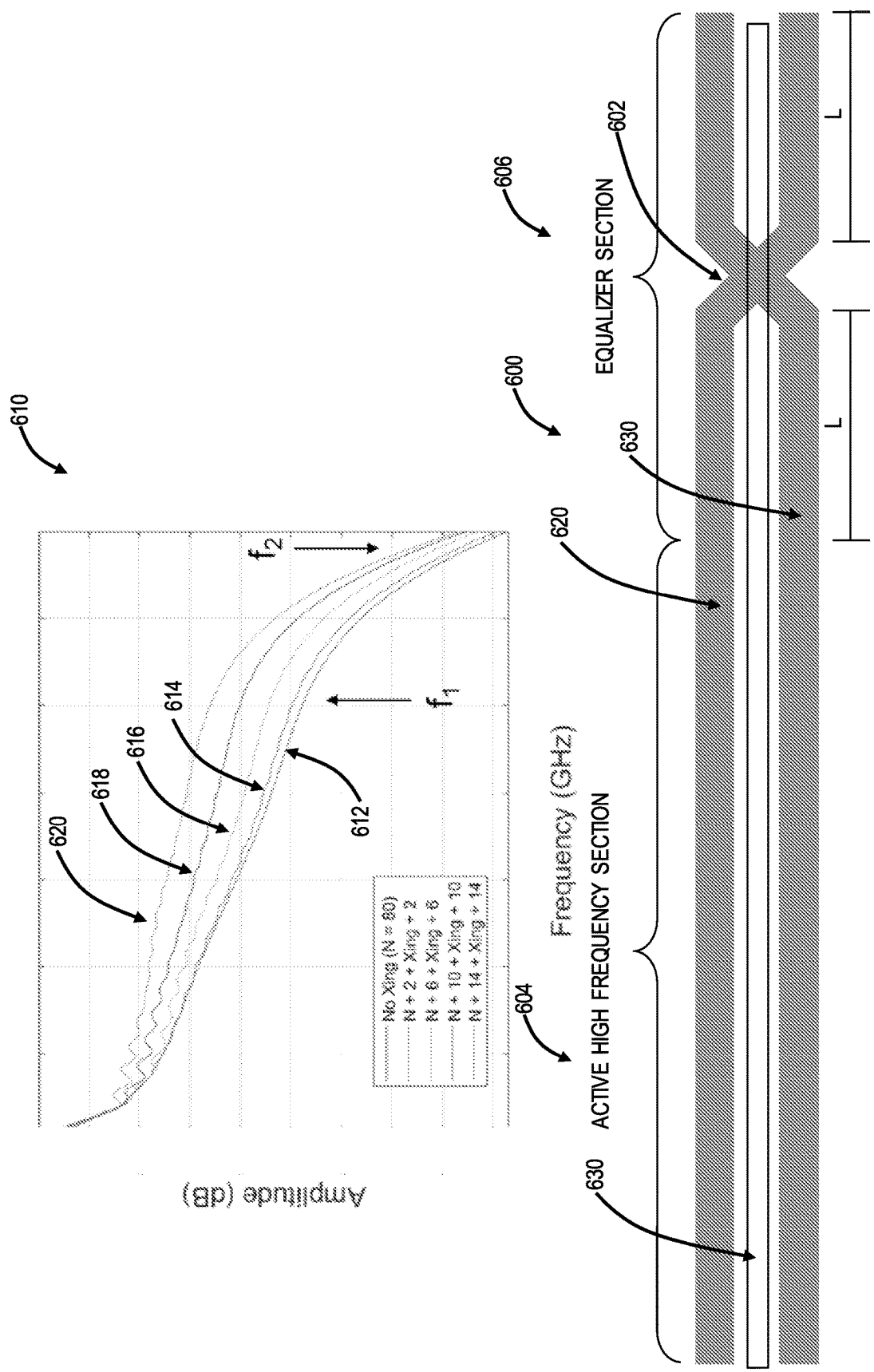
FIG. 15 is a diagram of an optical modulator with an RF crossing between two sections, and a graph illustrating different values for the sections.

FIG. 15 is a diagram of an optical modulator 600 with an RF crossing 602 between two sections 604, 606, and a graph 610 illustrating different values for the sections 604, 606. In this second implementation, the optical modulator 600 is separated into two sections 604, 606: an active low frequency section 604 and an equalizer section 606. To keep the DC $V_{pi}$ constant, an equal amount of modulator length must be added around the RF crossing 602. These added modulator lengths will cancel each other without affecting the amplitude of the signal (at low frequencies). In this implementation, the price to pay to improve the EO response is an increased optical loss since the modulator is longer by $L_{eq}$. This is an advantageous implementation for low loss modulators such as TFLN.

At the end of the frequency band of operation (indicated by $f_1$ in the graph 610), the RF signal will still be relatively large at the position x=L and will fade out significantly at the crossing point. Compared to a modulator of length L, the high frequency components will be larger thus improving and maximizing the modulation amplitude. At larger frequencies (indicated by $f_2$), the signal is almost completely attenuated at x=L. As a result, increasing the modulator length by $L_{eq}/2$ does not significantly change the amplitude of the modulator.

In this analysis, we again used the same modulator segments as before. L is the length associated to N=80 segments (again, the segments is just one way to implement the optical modulator length, and a continuous implementation is also contemplated). A curve 612 does not have any crossing and $L_{eq}$=0. For curves 614, 616, 618, 620, $L_{eq}/2$=2, 6, 10 and 14 segments respectively. In this example, it can be seen that compared to the baseline modulator, every modulator with an equalizer section has more modulation and the EO response is flatter. At $f_1$, the gain between 10 and 14 segments is still significant. As a result, more peaking could be obtained with longer $L_{eq}$ at the expense of increased optical losses. It can also be seen that the crossing is indeed improving the RF response of the modulator without changing its DC amplitude ($V_{pi}$).

RF Electrical Crossing for Equalization—Cont.

Referring to FIGS. 1, 7, 14, and 15, the present disclosure includes an RF crossing 420, 502, 602 where RF signal lines 470, 630 (which can also be referred to as electrodes) cross whereas an optical waveguide 460, 630 does not cross, on the modulator 410 (FIG. 7), 500 (FIG. 14), and 600 (FIG. 15). These are now compared and contrasted to one another and to the modulator 100 in FIG. 1. The modulator 100 in FIG. 1 includes an optical crossing where the optical waveguide itself is crossed, not the RF signal lines. As noted herein, the optical crossing creates challenges in matching, as well as introduces crosstalk and reflection at the optical crossing. Of note, the modulators 410, 500, 600 do not include any crossing of the optical waveguide 460, 630.

Figure 16:
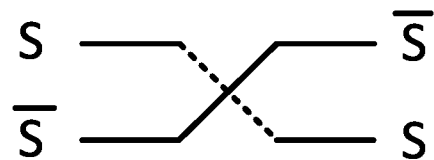
FIG. 16 is a circuit diagram of a differentially driven modulator (S-Sbar).

In FIG. 7, e.g., the RF crossing 420 is introduced for purposes of canceling out $V_{pi}$ and/or optical loss imbalance, due to misaligned masks. For these purposes, the RF crossing 420 includes flipping the S and Sbar electrodes (where S=signal, see FIG. 16 which is a circuit diagram of a differentially driven modulator (S-Sbar)). Of note, in the modulator 410, to ensure that the modulation keeps adding up in phase in the modulator segments after the RF crossing 420, the PN junction after the RF crossing 420 are reversed. See FIG. 7 where the RF line crossing 420 is between NPPN segments 430 and PNNP segments 440. Here, the RF crossing 420 design is low loss over an appropriate bandwidth. That is, in FIG. 7, the diodes are flipped after the RF crossing 420 so that we keep adding phase.

Of note, in FIGS. 14 and 15, there is no doping between the electrodes 620, 630 before or after the RF crossing 502, 602. Thus, there is no reversing of doing in this equalizer application; this is important as the present disclosure is not using the RF crossing 502, 602 to cancel out $V_{pi}$ and/or optical loss imbalance, but rather for destructive interference at low frequencies for equalization. Again, the low frequencies for equalization can be about half of the optical modulator bandwidth or less.

Thin Film Lithium Niobate (TFLN) Modulator

This approach for option 2 is an interesting implementation for TFLN modulators. Generally, the length of TFLN modulators is fixed by the target $V_{pi}$. Once the length is fixed, there are few knobs to tune to achieve better BW. Some of them are:

(1) Maximizing the velocity matching of the RF and optical waves. However, when matched, nothing else can be done on that aspect.

(2) Minimizing RF losses. This is done mostly in the fabrication part (i.e., changing to more expensive quartz substrates, better metal conductor choice, etc.)

Because the optical losses of a TFLN modulator are very low, increasing the length of the design to achieve the equalization and to boost the modulation amplitude (around $f_1$ in the example above) does not cost much.

RF Electrical Crossing in TFLN Modulator

Figure 17:
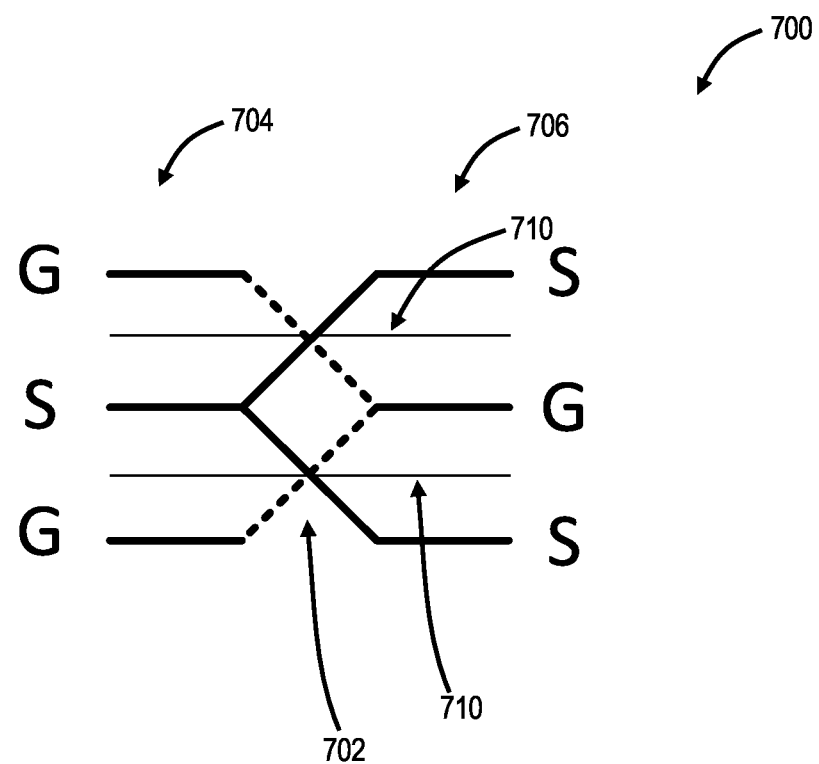
FIGS. 17-20 are diagrams of RF crossings for a TFLN modulator where there are electrodes for signal (S) and ground (G).

Referring to FIGS. 1-4, the modulators 100, 200, 300, 350 are examples of TFLN modulators, modified with the optical crossing (the modulator 100), RF bends (the modulator 200), ferroelectric domain inversion (the modulator 300), and reverse polarity (the modulator 350). Referring to FIGS. 14-15, the modulators 500, 600 are illustrated for differentially driven modulator (S-Sbar), namely two RF electrodes 630, and the RF crossing for a differentially driven modulator (S-Sbar) is illustrated FIG. 16. However, the approach in option 2, applied to a TFLN modulator, is different because these modulators are driven in single-ended. So, the RF crossings must have a different design, from FIGS. 14-15, as are illustrated in FIGS. 17-20. In a TLFN modulator 700, an RF crossing 702 needs to split the original signal (S) in two and keep only one ground (G) such as a GSG RF waveguide 704 becomes a SGS RF waveguide 706, as shown in FIG. 17. Also, note optical waveguides 710 do not cross and the doping remains the same before and after RF crossing 702. This will act as a phase shift and make the modulation coming from the subsequent segments, after the RF crossing 702 in the SGS RF waveguide 706, out of phase with the optical modulated signal, thereby causing destructive interference. Of note, FIG. 17 only shows a portion of the TLFN modulator 700 focused on the RF crossing 702. The TLFN modulator 700 has a similar structure as the modulator 100, except the RF crossing 702 and without the optical crossing.

Figure 18:
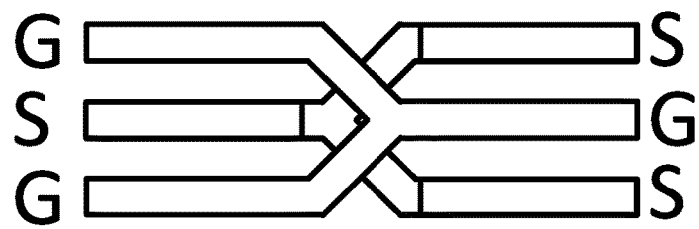
Figure 19:
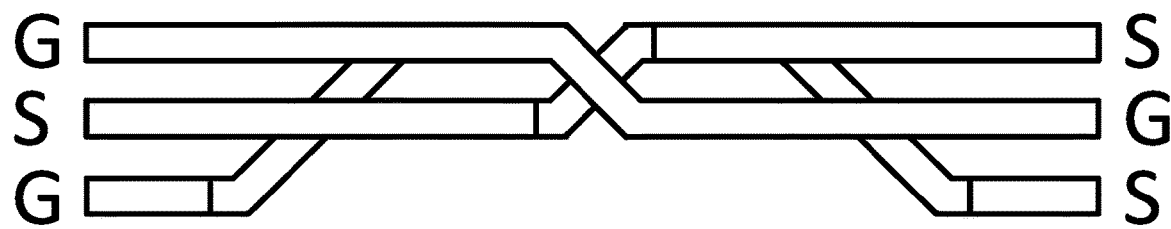
Figure 20:
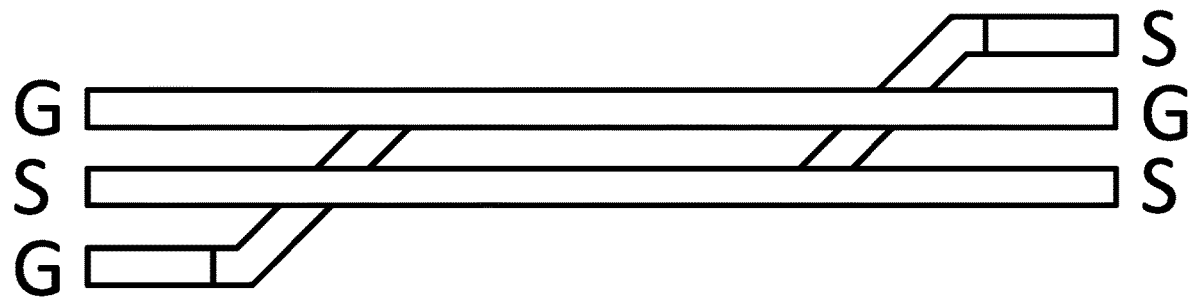

FIGS. 18-20 illustrate some general schematics of such crossings for the TLFN modulator 700. While these designs may prove to be difficult to achieve for a broadband operation (0-100 GHz and more), the RF crossing 702 necessary for this approach to work need only be low loss at lower frequencies, i.e., 30 GHz and below, since the high frequency content is already strongly attenuated at this point. Furthermore, at these lower frequencies, the velocity matching is not very critical which also eases the design.

Barium Titanate (BTO) Modulator

As in the case for TFLN, BTO modulators may also benefit from this approach. The RF crossing as an equalizer can improve their EO bandwidth. This equalizer approach may be useful to minimize the large drop at low frequencies experienced with this material as long as this does not introduce a mid-band droop. Careful crafting trading off the low frequency drop vs droop in the mid-band frequency must thus be done.

Other Modulator Types

In addition to TLFN modulators and BTO modulators, the RF crossing for equalization can be used in various other modulator types. For example, the RF crossing for equalization can be used in ferro electric or pockel based MZM modulators. Also, the RF crossing for equalization can be used in Quantum-Confined Stark Effect (QCSE) or even Ge/SiGe MQW phase shifters. That is, the approach described herein can be applied to any material system which performs excitation and optical phase shift.

RF Crossing Transitions Topologies

FIGS. 21-25 are diagrams for the RF crossings illustrating possible crossing topologies when considering electrical signal propagation through conducting media separated by dielectrics. Note that for each case considered, we limited the analysis to the minimal number of layers (crossing thickness) such a way that adding layers is topologically identical to the cases presented. All geometrical symmetries of the proposed designs are not shown.

Figure 21:

The proposed crossings have the limitation for each conductor to be continuous. In the high frequency electrical domain, other types of crossing transitions could be possible, but would not allow for direct current to flow through the crossing. FIG. 21 illustrates two signals in two conductors (requires two levels) of type AB→BA. This is usually used to exchange the position of ground (G) and signal (S) lines.

FIGS. 22-23 illustrate two signals in three conductors (requires two levels) of type ABA→BAB. One example would be to flip the inner and outer electrodes of a GSG transmission line. Unlike the previous case, this one can be physically represented in many ways.

FIGS. 24-25 illustrate three signals, three conductors (requires two or three levels) of type ABC→CBA. One example would be flip the position of the two complements of a GSG$\overline{S}$G transmission line, when the outer grounds are stripped (leaving a SG$\overline{S}$ transmission line).

Optical Modulator and Process

In an embodiment, an optical modulator 500, 600, 700, includes an optical waveguide 630, 710 extending a length; and a plurality of Radio Frequency (RF) electrodes 630 configured to modulate an optical signal in the optical waveguide 630, 710 wherein the RF electrodes 630 include an RF crossing 502, 602, 702 located at or near an end of the length and that is configured to equalize the optical signal.

As described herein, the optical signal is equalized via destructive interference after the RF crossing 502, 602, 702. At or near the end of the length, high frequencies of the optical signal are already strongly attenuated whereas low frequencies of the optical signal are not such that the low frequencies are equalized after the RF crossing. The low frequencies are below about half of modulator bandwidth.

In an embodiment of option 1, the length includes a set number of sections, and wherein the RF crossing is included in a section at or near the end of the length, where the section is selected based on an amplitude versus frequency response and a desired amount of equalization. In an embodiment of option 2, the length includes an active low frequency section and an equalizer section disposed thereafter that includes the RF crossing.

The optical modulator 500, 600 can be differentially driven where the plurality of RF electrodes include a signal electrode (S) and an inverse signal electrode ($\overline{S}$), wherein the signal electrode and the inverse signal electrode cross at the RF crossing. The plurality of RF electrodes can include three electrodes arranged to provide signal (S) and ground (G) to the plurality of modulator sections. The optical modulator 700 can be a Thin-Films Lithium Niobate (TFLN) modulator. Alternatively, the optical modulator can be a Barium titanate (BTO) modulator. In other embodiments, the optical modulator can be a ferro electric-based modulator, a Quantum-Confined Stark Effect (QCSE), a Ge/SiGe Multiple Quantum Well (MQW) phase shifter, and the like.

Figure 26:
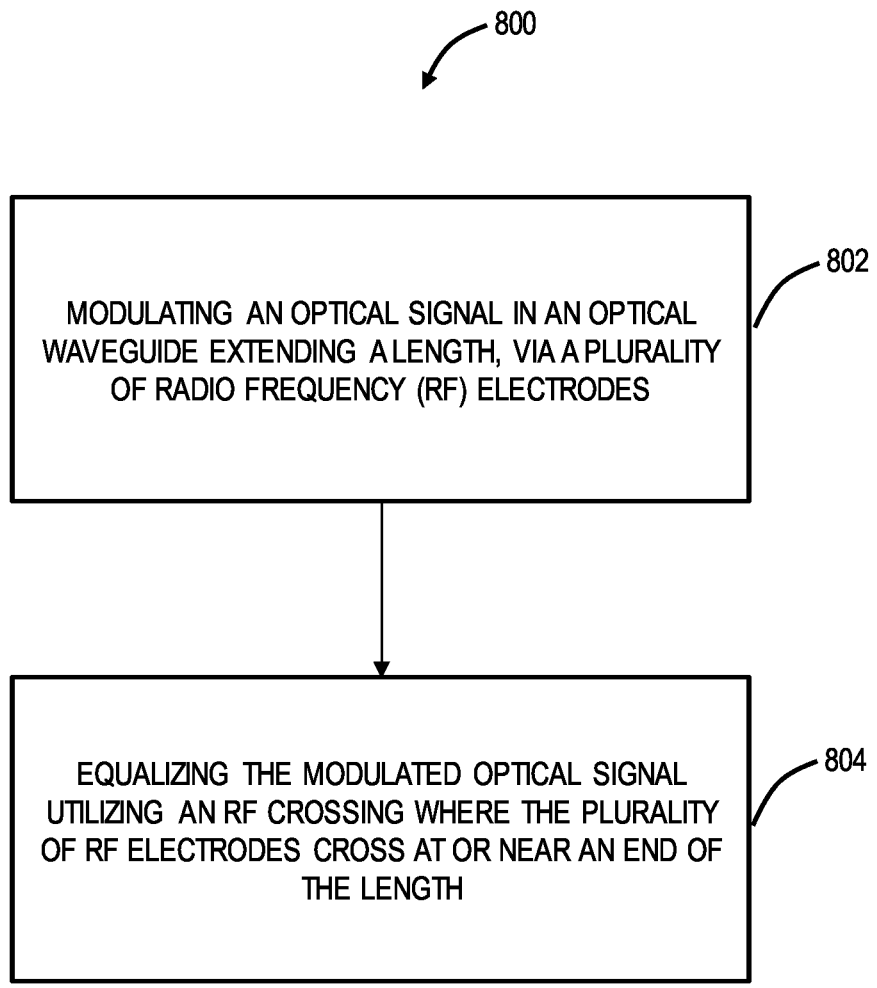
FIG. 26 is a flowchart of a process of operating the optical modulator described herein.

FIG. 26 is a flowchart of a process 800 of operating the optical modulator 500, 600, 700. The process 800 includes modulating an optical signal in an optical waveguide extending a length, via a plurality of Radio Frequency (RF) electrodes (step 802); and equalizing the modulated optical signal utilizing an RF crossing where the plurality of RF electrodes cross at or near an end of the length (step 804).

CONCLUSION

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. An optical modulator comprising:
   an optical waveguide extending a length; and
   a plurality of Radio Frequency (RF) electrodes configured to modulate an optical signal in the optical waveguide, wherein the RF electrodes include an RF crossing that is located at or near an end of the length and configured to equalize an RF response of the modulated optical signal,
   wherein the RF electrodes comprise a signal electrode flanked by ground electrodes and define a 1×2 splitter and a 2×1 combiner formed as a stack of layers.

2. The optical modulator of claim 1, wherein the RF response of the modulated optical signal is equalized via an opposite polarity modulation after the RF crossing.

3. The optical modulator of claim 2, wherein, at or near the end of the length, high frequencies are attenuated more than low frequencies, such that modulation at the low frequencies is reduced after the RF crossing and equalized with modulation at the high frequencies.

4. The optical modulator of claim 3, wherein the low frequencies are below about half of modulator bandwidth.

5. The optical modulator of claim 2, wherein, after the RF crossing, modulation amplitude is attenuated with little effect on the Electro-optic (EO) response.

6. The optical modulator of claim 1, wherein the length includes a set number of sections, and wherein the RF crossing is included in a section at or near the end of the length, where the section is selected based on an amplitude versus frequency response and a desired amount of equalization.

7. The optical modulator of claim 1, wherein the length includes an active low frequency section and an equalizer section disposed thereafter that includes the RF crossing.

8. The optical modulator of claim 1, wherein the optical modulator is a ferro electric-based modulator.

9. The optical modulator of claim 1, wherein the optical modulator is a Quantum-Confined Stark Effect (QCSE).

10. The optical modulator of claim 1, the optical modulator is a Ge/SiGe Multiple Quantum Well (MQW) phase shifter.

11. The optical modulator of claim 1, wherein the optical modulator is a Thin-Films Lithium Niobate (TFLN) modulator.

12. The optical modulator of claim 1, wherein the optical modulator is a Barium titanate (BTO) modulator.

13. The optical modulator of claim 1, wherein the optical modulator is a Mach-Zehnder Modulator (MZM) based on the Pockels effect.

14. A method of operating an optical modulator comprising:
    modulating an optical signal in an optical waveguide extending a length, via a plurality of Radio Frequency (RF) electrodes; and
    equalizing an RF response of the modulated optical signal with an RF crossing where the plurality of RF electrodes cross at or near an end of the length,
    wherein the RF electrodes comprise a signal electrode flanked by ground electrodes and define a 1×2 splitter and a 2×1 combiner formed as a stack of layers.

15. The method of claim 14, wherein the equalizing is via an opposite polarity after the RF crossing.

16. The method of claim 15, wherein, at or near the end of the length, high frequencies attenuated more than low frequencies, such that modulation at the low frequencies is reduced the RF crossing and equalized with modulation at the high frequencies.

17. The method of claim 14, wherein the length includes a set number of sections, and wherein the RF crossing is included in a section at or near the end of the length, where the section is selected based on an amplitude versus frequency response and a desired amount of equalization.

* * * * *